J. M. PIERCE.
FEED CUP.
APPLICATION FILED OCT. 21, 1908.
924,377. Patented June 8, 1909.
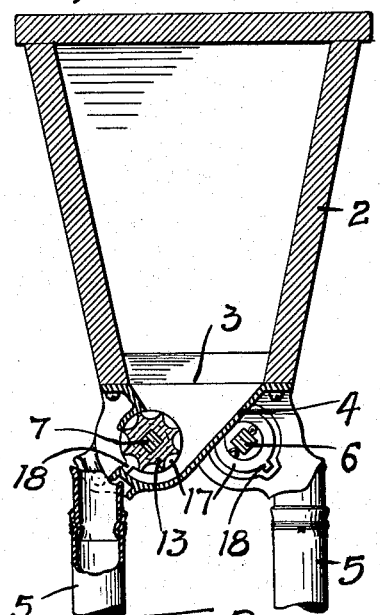
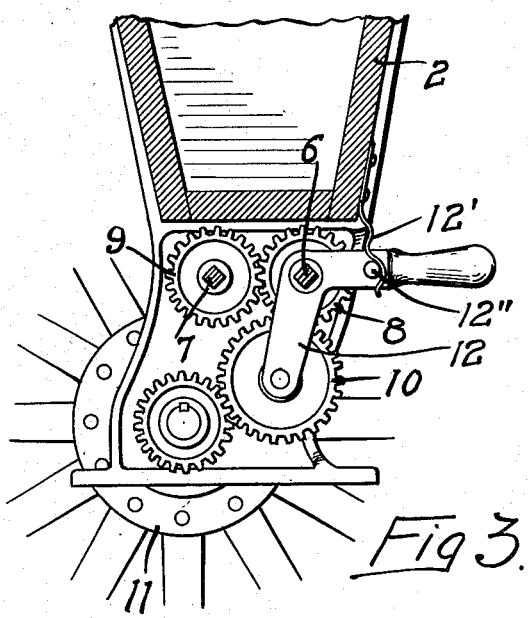
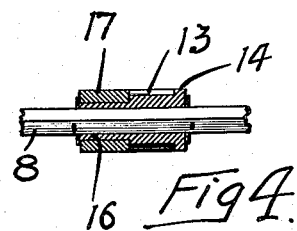
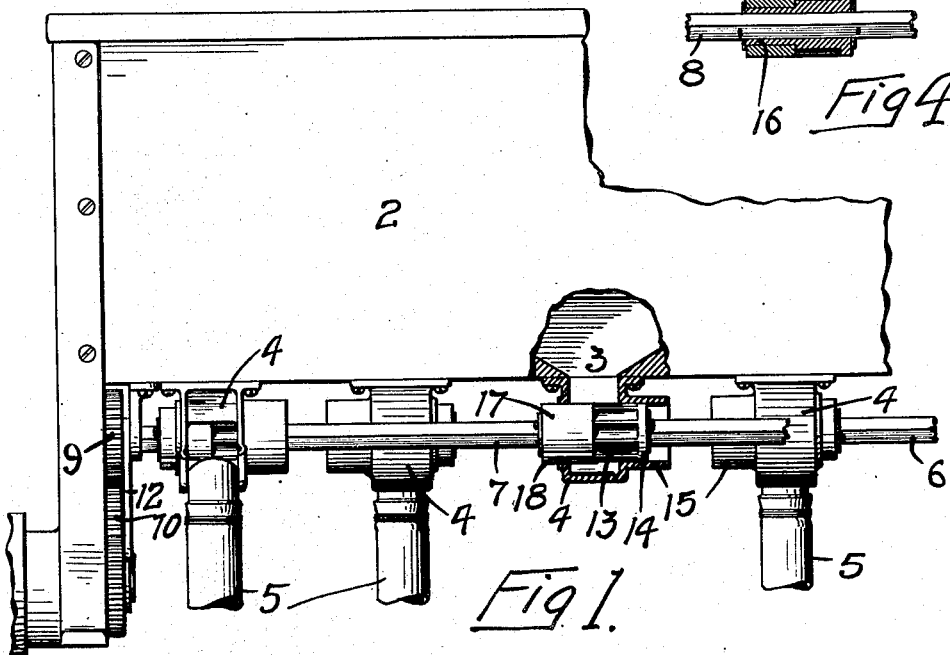

UNITED STATES PATENT OFFICE.

JAMES M. PIERCE, OF OWATONNA, MINNESOTA.

FEED-CUP.

No. 924,377.  Specification of Letters Patent.  Patented June 8, 1909.

Application filed October 21, 1908. Serial No. 458,908.

*To all whom it may concern:*

Be it known that I, JAMES M. PIERCE, of Owatonna, Steele county, Minnesota, have invented certain new and useful Improvements in Feed-Cups, of which the following is a specification.

My invention relates to feed cups for seed drills and the object of the invention, is to provide means which will prevent bending or twisting of the tubes from the feed cups when the shoes are raised.

A further and an important object of my invention is to provide a means for delivering the seed to the furrows which will insure the planting of the seed a uniform depth.

A further object is to simplify and improve the construction of the wheel dispensing entirely with the ring or rosette usually employed in connection with the corrugated portion of the feed wheel.

In the accompanying drawings forming part of this specification, Figure 1, is a detail view partially in section illustrating the application of my invention to the hopper of a drill, Fig. 2, is a transverse sectional view of the hopper, Fig. 3, is a similar view illustrating the mechanism at the end of the machine for operating the connecting gear. Fig. 4, is a detail sectional view of the feed wheel.

In the drawing, 2 represents the hopper of the drill having feed openings 3 beneath which the casings 4 are secured. These casings I prefer to arrange as shown in Fig. 2, with their discharge openings alternating toward the front and the rear of the machine. Spouts 5 of flexible material are attached to these casings and extend down into the shoes (not shown). These spouts as indicated, hang vertically and when the shoes are raised, the spouts will remain in this position undisturbed, whereas in machines of this kind, as ordinarily constructed, the spouts will be bent or twisted when the shoes are raised, resulting frequently in cracking or breaking the spouts. The spouts hang vertically and deliver the seed to the furrows in the same relative position and the seed will in consequence, be planted uniformly. In machines of this kind as usually constructed, one set of spouts depends from the feed cups at such an angle to the horizontal that the delivery ends of the spouts are in such a position that the seed will not be covered as deeply as the seed delivered from the other set of seed spouts. This has been found a serious objection to the seeder having one feed shaft and one set of feed cups. In the machine which I have shown herein, all this difficulty and objection is avoided. The two sets of feed cups in staggered relation with one another, permit the use of vertically arranged spouts which will deliver the seed in precisely the same relative position with respect to the disks.

With the casings arranged and shown in Fig. 2, I provide two operating rods 6 and 7 arranged side by side under the hopper and extending horizontally through the casings, each rod passing through the alternate casings. These rods slide in gears 8 and 9 at the end of the machine, and a gear 10 driven from the wheel 11, meshes with the gear 8 and is carried by a bell crank lever 12 and is rendered operative or inoperative by the movement of said lever. A spring 12' engages a pin 12'' on said lever and holds it in its operative or inoperative position. A feed wheel is mounted on each rod within the respective casings and consists of a fluted portion 13 and a blank portion 14, the casing having a long hub 15 inclosing the part 14. The other end of the feed wheel has a hub 16 fitting within a sleeve 17 that is adapted to slide back and forth within the said feed wheel in the casing and is held against rotary movement by a web 18. This sleeve prevents the seed from working out through that end of the casing as it forms a close sliding joint with the casing wall. At the other end, the blank 14 closes the joint and the seed dropping into the flutes of the feed wheel 13, can not possibly work out at the ends of the casing. The volume of the feed is determined as usual by the adjustment of the feed wheel, a greater or less area of the flutes being exposed according to the feed desired. The casings are all interchangeable, it being merely necessary to reverse their positions on the hopper to provide for the staggered relation illustrated in Fig. 2.

I claim as my invention:

1. A feed wheel having a fluted middle portion and a blank surface at one end and a hub formed on its other end, a sleeve inclosing said hub and a casing having hubs forming close grain tight joints with said blank surface, and with said sleeve.

2. The combination with a hopper, of a series of feed wheel casings mounted thereon in staggered relation with one another, spouts attached to said casings and depending vertically therefrom, operating rods passing through said casings and feed wheels mounted on said rods, substantially as described.

3. The combination with a hopper, of casings secured thereon in staggered relation with one another, spouts attached to said casings and depending therefrom, operating rods passing through said casings, each rod passing through the alternate casings and feed wheels mounted on said rods.

4. The combination with a hopper, of a series of feed wheel casings depending therefrom, parallel operating rods passing through said casings, feed wheels mounted on said rods, spouts depending from said feed casings and adapted to deliver the seed in the same relative position whereby a uniform depth of planting will be insured.

5. The combination with a hopper, of feed wheel casings mounted thereon; spouts depending from said casings, parallel operating rods passing through said casings and feed wheels mounted on said rods and spouts arranged to deliver the seed in the same relative position whereby a uniform depth of planting will be insured.

In witness whereof, I have hereunto set my hand this 26th day of September 1908.

J. M. PIERCE.

Witnesses:
J. A. BYINGTON,
W. E. DRESSLER.